(12) United States Patent
Yue et al.

(10) Patent No.: US 10,342,311 B2
(45) Date of Patent: Jul. 9, 2019

(54) INFRARED INTELLIGENT CONSTANT-TEMPERATURE ELECTRIC BLOWER

(71) Applicant: ZHEJIANG YUELI ELECTRICAL CO., LTD., Ningbo, Zhejiang Province (CN)

(72) Inventors: Shiyang Yue, Ningbo (CN); Haiying Liu, Ningbo (CN)

(73) Assignee: ZHEJIANG YUELI ELECTRICAL CO., LTD., Ningbo, Zhejiang Province (CN)

(*) Notice: Subject to any disclaimer, the term of this patent is extended or adjusted under 35 U.S.C. 154(b) by 65 days.

(21) Appl. No.: 15/795,499

(22) Filed: Oct. 27, 2017

(65) Prior Publication Data

US 2019/0125055 A1    May 2, 2019

(51) Int. Cl.
| | | |
|---|---|---|
| *A45D 20/00* | (2006.01) | |
| *A45D 20/12* | (2006.01) | |
| *H02P 25/24* | (2006.01) | |
| *G01J 5/08* | (2006.01) | |
| *F26B 21/12* | (2006.01) | |
| *G01J 5/00* | (2006.01) | |
| *F26B 21/10* | (2006.01) | |

(52) U.S. Cl.
CPC .............. *A45D 20/12* (2013.01); *F26B 21/10* (2013.01); *F26B 21/12* (2013.01); *G01J 5/0025* (2013.01); *G01J 5/0806* (2013.01); *H02P 25/24* (2013.01)

(58) Field of Classification Search
CPC ................................ A45D 20/00; A45D 20/10
USPC ............................................... 34/96, 97, 283
See application file for complete search history.

(56) References Cited

U.S. PATENT DOCUMENTS

| | | | | |
|---|---|---|---|---|
| 5,636,318 A | * | 6/1997 | Polaert | A45D 20/12 34/268 |
| 7,123,823 B2 | * | 10/2006 | Ceva | A45D 20/10 392/385 |
| 9,642,434 B2 | * | 5/2017 | Hu | A45D 20/00 |
| 10,064,469 B2 | * | 9/2018 | Quessard | A45D 20/10 |
| 2003/0152373 A1 | * | 8/2003 | Wong | A45D 20/12 392/385 |
| 2006/0093337 A1 | * | 5/2006 | Chan | A45D 20/30 392/385 |

(Continued)

*Primary Examiner* — Gregory A Wilson
(74) *Attorney, Agent, or Firm* — The Dobrusin Law Firm, P.C.

(57) ABSTRACT

The invention discloses an infrared intelligent constant-temperature electric blower. The infrared intelligent constant-temperature electric blower comprises a blower body, an infrared temperature measuring device, an LCD device, a touch control button, an MCU processor and two silicon controlled rectifiers; the blower body is internally provided with a fan and a heating device; the infrared temperature measuring device is installed at an air outlet of the blower body; the LCD device is embedded on the outer side wall of the blower body; the touch control button is embedded on the outer side wall of the blower body; the MCU processor is internally arranged in the blower body, the input end is connected with the infrared temperature measuring device, and the output end is connected with LCD device; the two ends of one silicon controlled rectifier are connected to the MCU processor and the fan respectively.

7 Claims, 8 Drawing Sheets

(56) References Cited

U.S. PATENT DOCUMENTS

| | | | |
|---|---|---|---|
| 2013/0291394 A1* | 11/2013 | Shami | A45D 20/10 34/88 |
| 2014/0246040 A1* | 9/2014 | Stovall | A45D 20/00 132/202 |
| 2014/0298670 A1* | 10/2014 | Tahara | A45D 20/10 34/97 |
| 2015/0237984 A1* | 8/2015 | Souza | A45D 20/10 34/96 |
| 2017/0105502 A1* | 4/2017 | Maddocks | A45D 20/122 |
| 2019/0053597 A1* | 2/2019 | Woo | A45D 20/00 |

* cited by examiner

INFRARED INTELLIGENT CONSTANT-TEMPERATURE ELECTRIC BLOWER

BACKGROUND OF THE INVENTION

1. Field of the Invention

The invention relates to the field of electric blower, more specifically, to an infrared intelligent constant-temperature electric blower.

2. Description of the Related Art

Electric blower is one of things that people often use in their daily life. It has two major functions, one is to stereotype the hair, and the other is to dry the wet hair. Hair styling usually requires the use of hairspray. Therefore, the most important function of an electric blower is to blow-dry hair. In the process of drying hair, the humidity of the hair keeps falling down but the present electric blower has no recognition function and whether the hair is wet or not can only be judged by the users' feeling. So there is two major shortcomings. One is in the process of drying hair, the humidity of hair has dropped but the temperature of the heating coil cannot be changed, as a result, a great deal of power will be consumed. The other is if users do not pay attention while using it, excessive hot air may hurt hair, scorch the hair, and even hurt users.

The Chinese utility model (CN 201008412Y) disclosed an infrared induction electric blower, comprising a blower and a handle. The blower is equipped with an infrared sensor which can induce the external temperature and humidity, and the infrared sensor is connected with the internal control circuit of the electric blower. The internal control circuit comprises a power circuit, a single-chip processing circuit and a drive circuit. The infrared sensor is connected to a single-chip of the single-chip processing circuit. The infrared sensor can be installed at the inner side of the air outlet of the blower or at the outside of the air outlet housing. The utility model detects the temperature and the humidity of the consumer's hair through infrared sensor, the detected date is analyzed and processed by the single-chip and then controls the work of the heating coil and the fan. Moreover, through the design of the single-chip program, the heating degree of the heating coil can be reduced with the decrease of the hair humidity of the consumer, so that the double effects of saving energy and protecting hair can be achieved.

However, although the structure of the electric blower above mentioned can detect the temperature of the user's hair through infrared, but the temperature of hair cannot be displayed on the electric blower, thus the users cannot intuitively know the temperature of his hair and set the temperature of the electric blower.

SUMMARY OF THE INVENTION

Aiming at the above-mentioned problems in the prior technology, the present invention provides an intelligent infrared constant temperature blower, so that the user can intuitively know his hair temperature, and automatically regulates the blowing temperature of the electric blower according to the actual hair temperature.

The specific technical scheme is as follows:

An infrared intelligent constant-temperature electric blower, comprising: a blower body which is internally provided with a fan and a heating device, an infrared temperature measuring device installed at an air outlet of the blower body, a LCD device embedded on the outer wall of the blower body, a touch control button embedded on the outer wall of the blower body, a MCU processor internally arranged in the blower body, the MCU processor having an input terminal connected with the infrared temperature measuring device, and having an output terminal connected with the LCD device, two silicon controlled rectifiers, two ends of one silicon controlled rectifier being connected to the MCU processor and the fan respectively, and two ends of the other silicon controlled rectifier being connected to the MCU processor and the heating device respectively.

The electric blower provided in the present invention, wherein an iron net is paved in the air outlet of the blower body; the infrared temperature measuring device comprises: an infrared chip assembly arranged in the blower body, an infrared lens assembly arranged in the blower body and is sleeved on the infrared chip assembly, a fixed rack penetrating a centre hole of the iron net, and engaged with the infrared lens assembly and the infrared chip assembly respectively; wherein, the fixed rack and the infrared lens assembly are combined to form a clamping part of the iron net.

The electric blower provided in the present invention, wherein the LCD device comprises: a LCD screen embedded on a groove of the outer wall of the blower body, a display screen shield arranged on the periphery of the LCD screen, and a lens embedded on the display screen shield; wherein, a frame is arranged in the groove for positioning the LCD screen, an round hole of each corner of the display screen shield is fitted with a column of each corner of the frame, and a groove on the upper side of the display screen shield mentioned functions as a routing path between the LCD screen and an main program control circuit board assembly in the blower body.

The electric blower provided in the present invention, wherein the touch control button comprises from inside to outside successively: a button control circuit board, a button pad, a button circuit board bracket, a function button and a function button bracket. One side of the button control circuit board is connected with the main program control circuit board assembly through a lead. Wherein, a convex cavity on the button pad is fitted with the button on the button control circuit board, and is connected with the mounting hole on the button control circuit board through a column on the back of the button circuit board bracket, the button on the button control circuit board passes through the square holes longitudinally distributed along the button circuit board bracket and opening grooves on the both sides of the square holes, and is fitted in the function button and the function button bracket successively.

The electric blower provided in the present invention, further comprising a nozzle detachably installed at the air outlet of the blower body. Wherein, the nozzle is provided with a flange at the side which is connected with the blower body, and a plurality of grooves are distributed radially along the circumference of the flange. The other side of the nozzle is a born shape, an arc is arranged on the upper and lower sides symmetrically.

The electric blower provided in the present invention, wherein a height between the center of the arc of the upper side and the center of the arc of the lower side matches a maximum scattering angle of the inflated lens assembly.

The electric blower provided in the present invention, wherein the fixed rack comprises a circular ring and two supporting legs arranged along the outer wall of the circular ring symmetrically. Wherein two square grooves and a breach are arranged along the axis direction of the circular ring, and one square groove adjacent to the circular ring is engaged with a convex block on the infrared lens assembly, the other square groove away from the circular ring is engaged with a convex block on the infrared chip assembly, the breach is fitted with a connection pan on the blower body.

The positive effect of the above-mentioned technical scheme is as follows:

According to the electric blower, the hair temperature of a user is sensed through the infrared temperature measuring device according to the blowing temperature set by the user and is displayed through the LCD device, automatic regulation of the beat power output and fan rotating speed of the electric blower is achieved, constant-temperature and healthy hair blowing is achieved, and therefore damage to the hair quality of the user is avoided.

BRIEF DESCRIPTIONS OF THE DRAWINGS

The accompanying drawings, together with the specification, illustrate exemplary embodiments of the present disclosure, and, together with the description, serve to explain the principles of the present invention.

Figure 1:
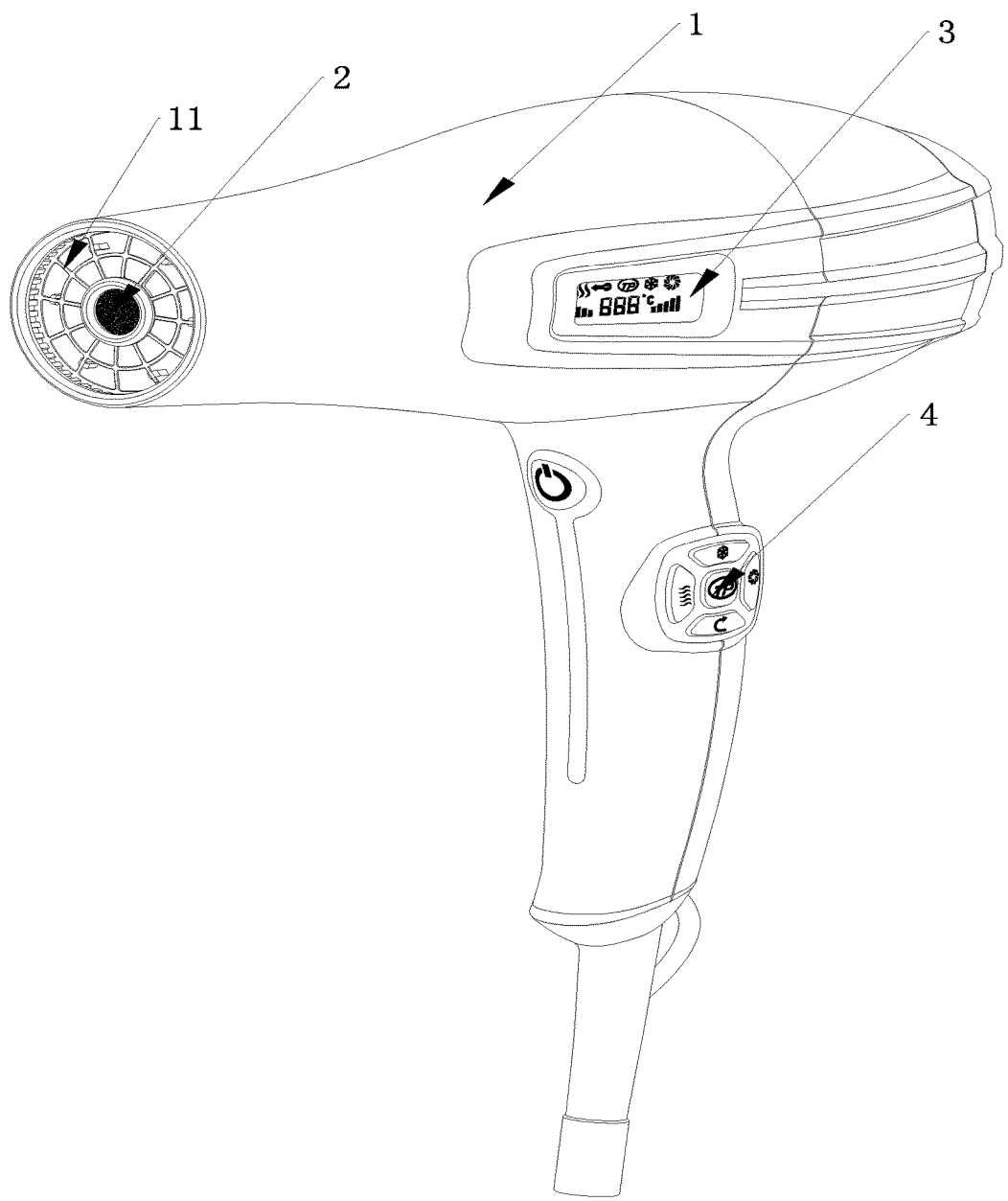
FIG. 1 is the stereogram figure of the embodiment of the infrared intelligent constant-temperature electric blower of the invention.

In the attached diagram: 1—blower body, 11—iron net, 111—centre hole, 12—groove, 13—frame, 14—column, 2—infrared temperature measuring device, 21—fixed rack, 211—circle ring, 212—supporting leg, 213—square groove, 214—breach, 22—infrared lens assembly, 221—convex block, 222—circular ring, 23—infrared chip assembly, 231—convex block, 3—LCD device, 31—LCD screen, 32—display screen shield, 321—round hole, 322—groove, 33—lens, 4—touch control button, 41—button control circuit board, 411—button, 412—mounting hole, 42—button pad, 421—convex cavity of the pad, 43—button circuit board bracket, 431—column, 432—square hole, 433—opening groove, 44—function button, 45—function button bracket, 3—nozzle, 51—flange, 52—groove, 53—arc, 6—MCU processor, 7—silicon controlled rectifier, 8—fan, 9—heating coil, 10—user's hair, 20—main program control circuit board assembly.

DETAILED DESCRIPTION

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the term "plurality" means a number greater than one.

Hereinafter, certain exemplary embodiments according to the present disclosure will be described with reference to the accompanying drawings.

In order to make the technical means, creative features, purpose achieved and the efficacy of this invention has realized easy to understand, the following embodiments combined with attached FIGS. 1 to 10 to illustrate the infrared intelligent constant-temperature electric blower provided in this invention in detail.

Figure 2:
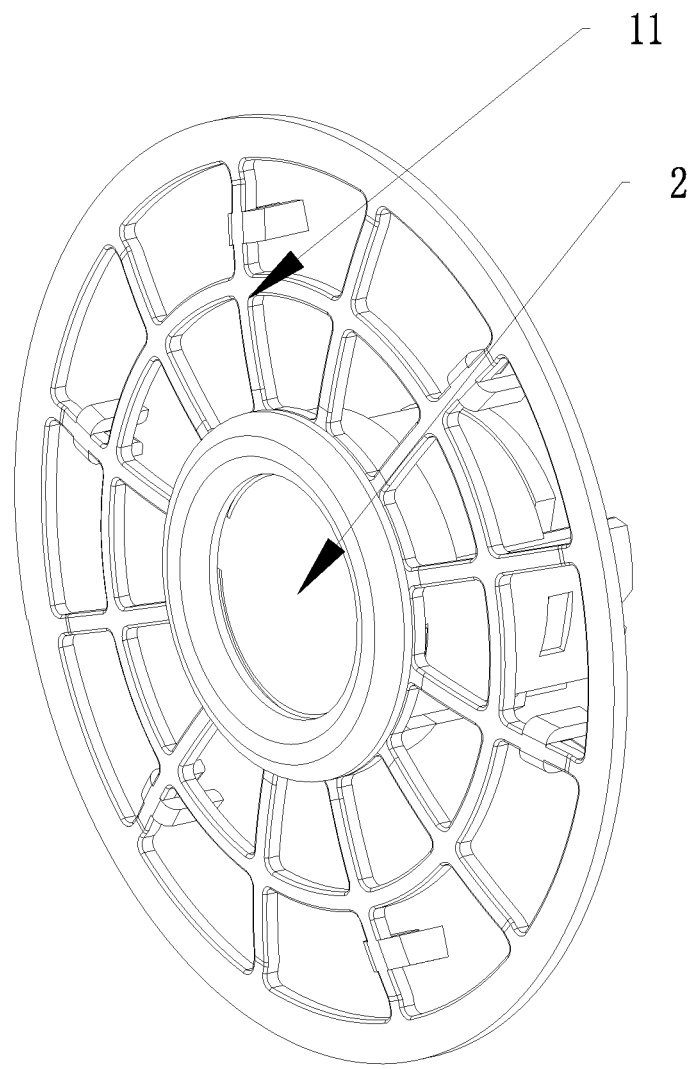
FIG. 2 is the stereogram figure of the embodiment of the infrared temperature measuring device of the infrared intelligent constant-temperature electric blower of the invention.
Figure 8:
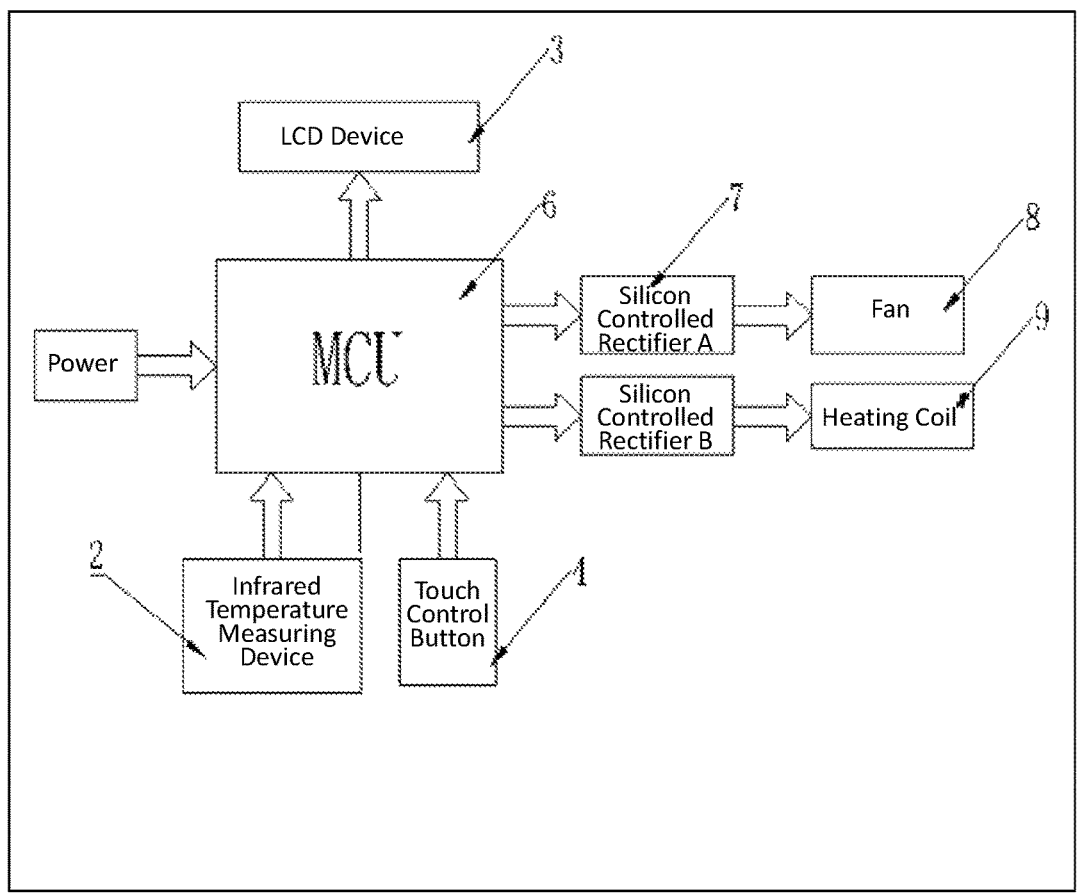
FIG. 8 is operational principle diagram of the infrared intelligent constant-temperature electric blower of the invention.

FIG. 1 is the stereogram figure of the embodiment of the infrared intelligent constant-temperature electric blower. FIG. 2 is the stereogram figure of the embodiment of the infrared temperature measuring device in the infrared intelligent constant-temperature electric blower. FIG. 8 is operational principle diagram of the infrared intelligent constant-temperature electric blower. According to the electric blower, the hair temperature of a user is sensed through the infrared temperature measuring device according to the blowing temperature set by the user and is displayed, the heat power output and the fan rotating speed are automatically regulated, and constant-temperature and healthy hair blowing is achieved. As shown in FIGS. 1, 2 and 8, this electric blower includes: a blower body 1, an infrared temperature measuring device 2, a LCD (liquid crystal display, hereinafter referred to as LCD) device 3, a touch control button 4, a MCU (micro control unit, hereinafter referred to as MCU) processor 6, two silicon controlled rectifiers 7, a fan 8 and a heating device 9.

Specifically, the fan 8 and the heating device 9 are provided in the inner of the blower body. In this embodiment, the heating device 9 includes a heating coil. An infrared temperature measuring device 2 is installed in an air outlet of the blower body 1 for detecting the temperature of the user's hair. An LCD device 3 is embedded on the outer side of the blower body 1 for visually displaying the temperature of the user's hair. A touch control button 4 is embedded on the outer side of the handle of the blower body 1 for setting temperature. An MCU processor 6 is arranged in the inner of the blower body, it has a input terminal connected with the infrared temperature measuring device 2 and has an output terminal connected with the LCD device 3 for receiving and processing the temperature signal which is detected by the infrared temperature measuring device 2. Wherein, two ends of the one silicon controlled rectifier 7 are connected to the MCU processor 6 and fan 8 respectively, two ends of the other silicon controlled rectifier 7 are connected to the MCU processor 6 and the heating device 9 respectively, to realize constant-temperature and healthy hair blowing.

Figure 3:
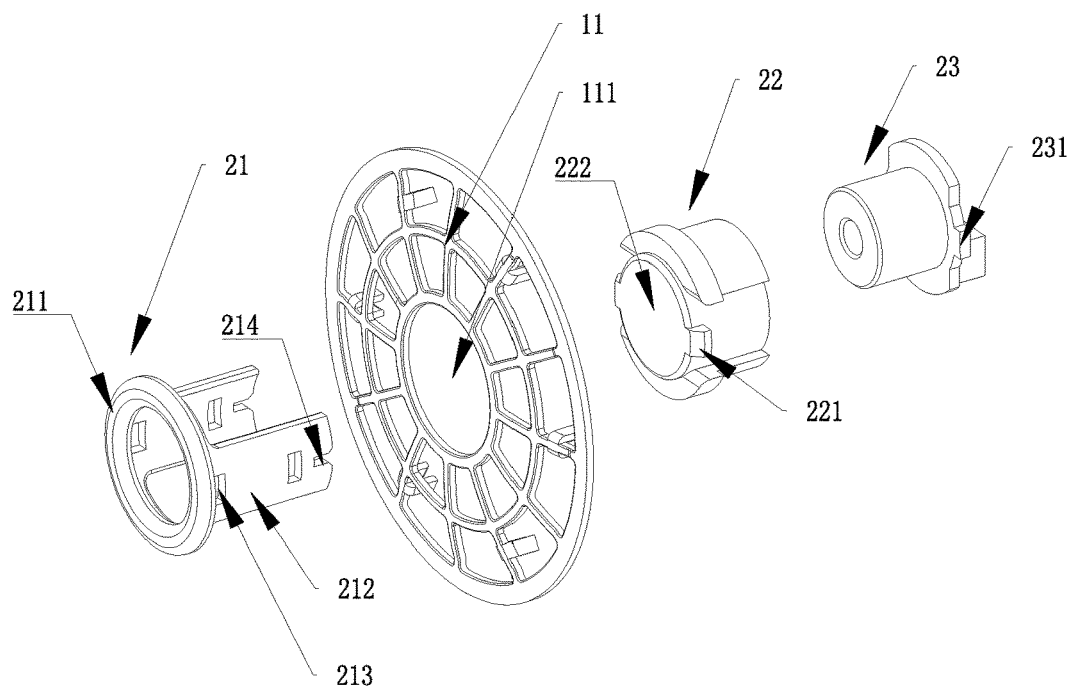
FIG. 3 is the explosive view of the infrared temperature measuring device of FIG. 2.

FIG. 3 is the explosive view of the infrared temperature measuring device of FIG. 2. In a preferred embodiment, as shown in FIG. 2 and FIG. 3, the infrared temperature measuring device 2 comprises a fixed rack 21, an infrared lens assembly 22 and an infrared chip assembly 23.

Specifically, an iron net 11 is arranged in the air outlet of the blower body 1, and the iron net 11 is further provided with a central hole 111. The infrared lens assembly 22 and the infrared chip assembly 23 are arranged in the blower body 1, and the infrared lens assembly 22 is sleeved on the infrared chip assembly 23. The fixed rack 21, which penetrates through the central hole 111, is engaged with the infrared lens assembly 22 and the infrared chip assembly 23 respectively, and the fixed rack 21 and the infrared lens assembly 22 are combined to form a clamping part of the iron net 11.

The fixed rack 21 comprises a circular ring 211 and the two supporting legs 212 arranged along the outer wall of the circular ring 211 symmetrically, and the circular ring 211 is integrally formed with the supporting legs 212. Two square grooves 213 and a breach 214 are arranged in the supporting foot 212 along the axial direction of the circular ring 211, the square groove 213 adjacent to the circular ring 211 is engaged with a convex block 221 on the infrared lens assembly 22, the hollow part of the circular ring 211 is engaged with the circular ring 222 in which the convex block 221 of the infrared lens assembly 22 is located. The square groove 213 away from the circular ring 211 is engaged with a convex block 231 on the infrared chip assembly 23. The breach 214 is fitted with a connected part (not shown) of the blower body 1.

Figure 4:
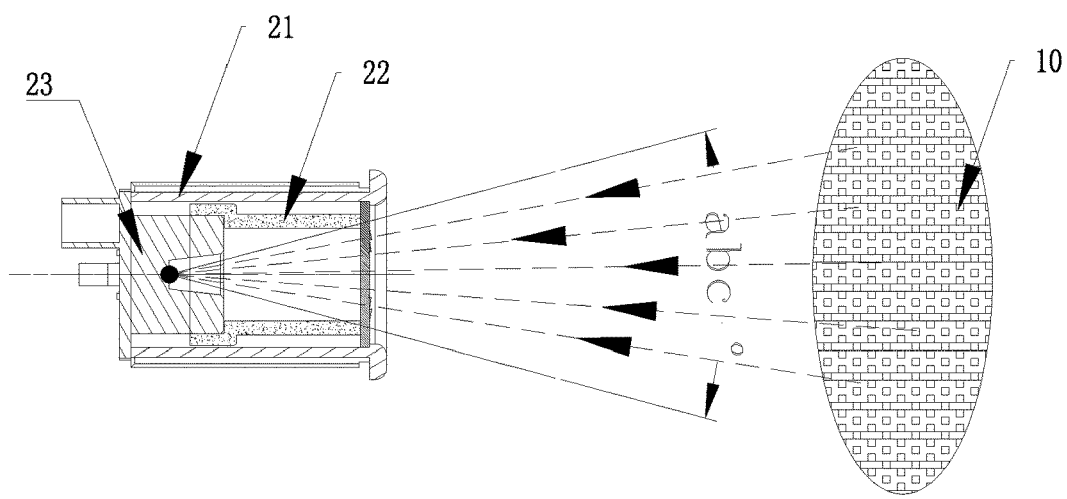
FIG. 4 is the optical principle diagram of the infrared temperature measuring device of FIG. 2.

FIG. 4 is the optical principle diagram of the infrared temperature measuring device of FIG. 2. Specifically, the infrared lens assembly 22 is Fresnel lens, the infrared chip assembly 23 is digital infrared receiving chip. The optical principle of the infrared temperature measuring device 2 is: the temperature of the user's hair 10 is sensed by the Fresnel lens, received by the digital infrared receiving chip and processed by the MCU processor 6, and then the result is passed to the LCD device 3, and is finally displayed on the LCD device 3.

Figure 5:
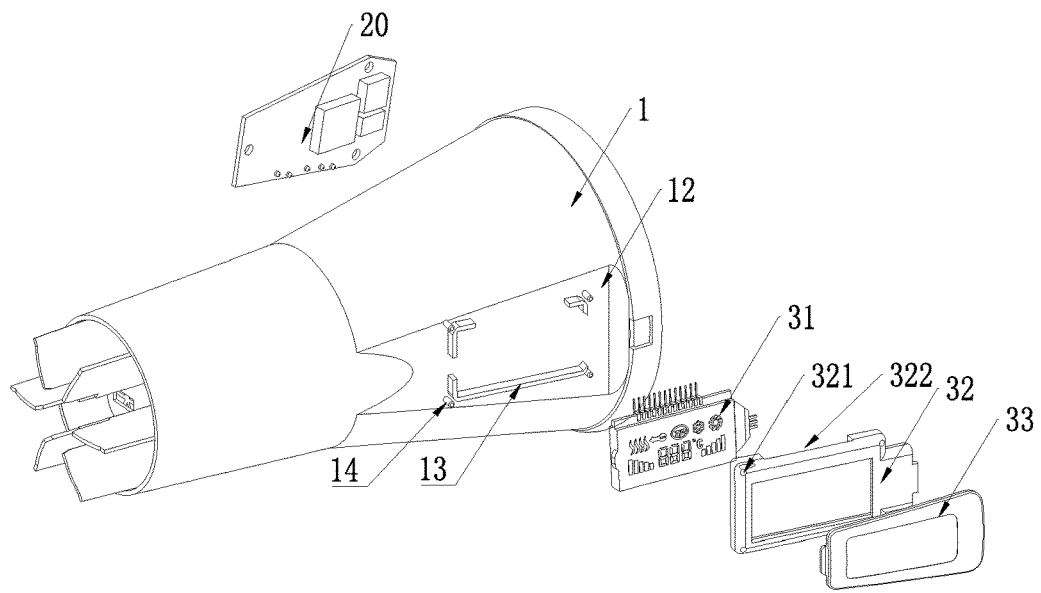
FIG. 5 is the installation diagram of the embodiment of the LCD device and the blower body of the infrared intelligent constant temperature electric blower.

FIG. 5 is the installation diagram of the implement of the LCD device and the blower body of the infrared intelligent constant-temperature electric blower. In a preferred embodiment, as shown in FIG. 1 and FIG. 5, LCD device 3 comprises a LCD screen 31, a display screen shield 32 and a lens 33.

Specifically, LCD screen 31 is embedded on the groove 12 of the outer wall of the blower body 1, a frame 13 is mounted in the groove 12 for positioning the LCD screen 31. The display screen shield 32 is arranged at the periphery of the LCD screen 31, and a round hole 321 of each corner of the display screen shield 32 is fitted with a column 14 of each corner of the frame 13, so that the LCD screen 31 is fixed on the blower body 1. The groove 322 on the upper side of the display screen shield 32 functions as a routing path between the LCD screen 31 and the main program control circuit board assembly 21 in the blower body 1. The lens 33 is embedded on the display screen shield 32 to protect LCD screen 31 from damaging.

In this embodiment, the touch control button 4 adjacent to the air outlet of the blower body 1 is defined as the left side, the touch control button 4 opposite to the air outlet of the blower body 1 is defined as the right side, the touch control button 4 adjacent to the LCD screen device 3 is defined as the upper side, the touch control button 4 opposite to the LCD screen device 3 is defined as the lower side.

Figure 6:
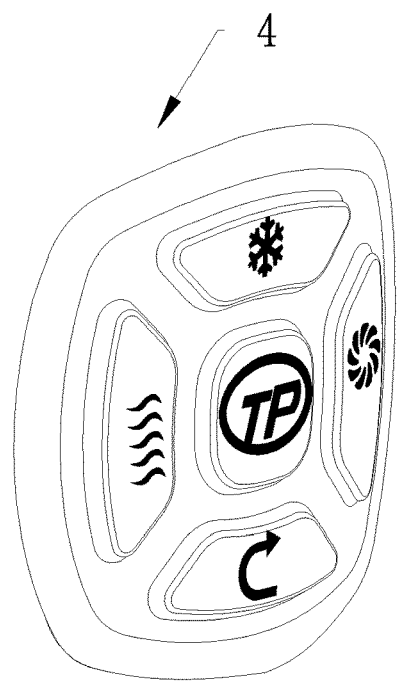
FIG. 6 is the structure diagram of the embodiment of the touch control button in the infrared intelligent constant-temperature electric blower of the invention.

FIG. 6 is the structure diagram of the touch control button of the embodiment of the infrared intelligent constant-temperature electric blower. In a preferred embodiment, as shown in FIGS. 5 and 6, the touch control button 4 has five function areas which correspond to the display area of the LCD screen 31. The five function areas are cold switch of the upper side, fast mode button of the lower side, heating select button of the left side, wind speed control button of the right side and the constant-temperature mode button of the centre. Correspondingly, the LCD screen shows blue style when user selects cold mode, the LCD screen 31 shows red style when user selects traditional heating mode, namely presses the heating selection button on the left side and the wind speed control button on the right side, the LCD screen 31 shows pink style when the user selects constant-temperature mode, namely, presses the central TP (constant-temperature, hereinafter referred to as TP) button.

Figure 7:
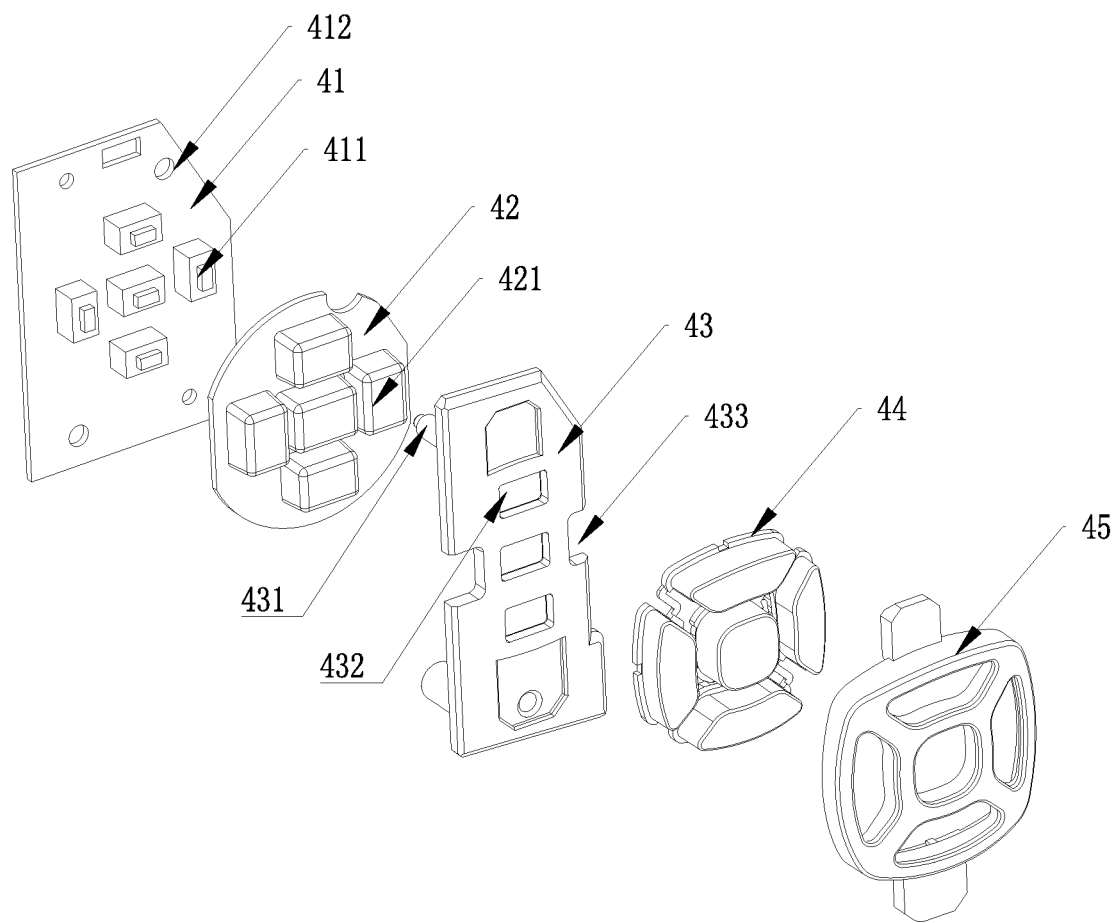
FIG. 7 is the explosive view of the touch control button of FIG. 6.

FIG. 7 is the operational principle diagram of an infrared intelligent constant-temperature electric blower. Specifically, as shown in FIGS. 6 and 7, the control button 4 comprises from inside to outside successively: a button control circuit board 41, a button pad 42, a button circuit board bracket 43, a function button 44 and a function button bracket 45.

Specifically, one side of the button control circuit board 41 is connected with the main program control circuit board assembly 20 in the blower body 1 through a lead. A convex cavity 421 on the button pad 42 is fitted to the button 411 on the button control circuit board 41, and is connected the mounting hole 412 on the button control circuit board 41 through the column 431 on the back of the button circuit board bracket 43, to fix the button pad 42 on the button control circuit board 41. Further, the button on the button control circuit board 41 passes through the square holes 432 longitudinally distributed along the button control circuit board bracket 43 and opening grooves 432 on both sides of the square hole 432, and is fitted in the function button 44 and the function button bracket 45 successively.

Embodiment 2

In this embodiment, the same part as the embodiment 1 is given the same reference number, and the same text description is omitted.

Figure 9:
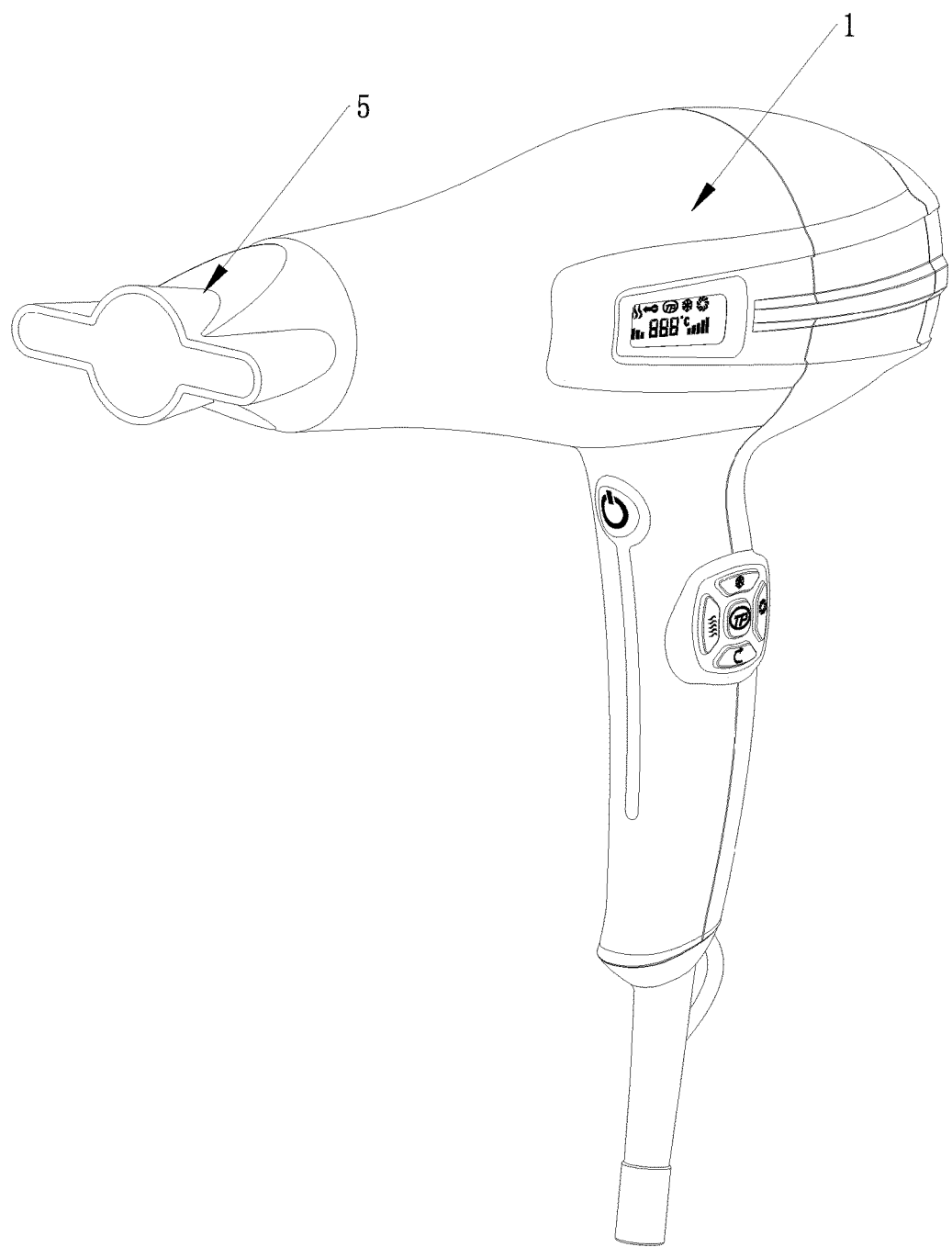
FIG. 9 is the structure diagram of the embodiment 2 of the infrared intelligent constant-temperature electric blower of the invention.
Figure 10:
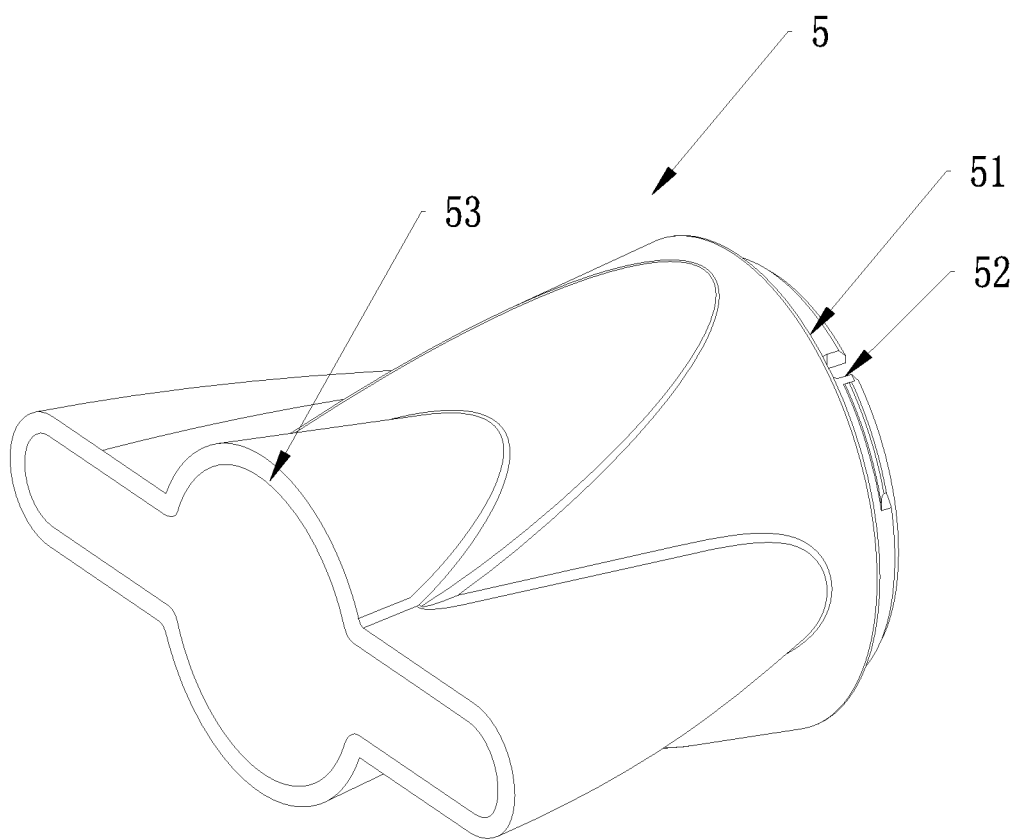
FIG. 10 is the structure diagram of the nozzle of FIG. 9.

FIG. 9 is the structure diagram of the embodiment 2 of the infrared intelligent constant-temperature electric blower, and FIG. 10 is the structure diagram of the nozzle of FIG. 9. In a preferred embodiment, as shown in the FIG. 9 and FIG. 10, the electric blower further includes a nozzle 5 detachably mounted at the air outlet of the blower body 1. The nozzle 5 is provided with a flange 51 at the side which is connected with the blower body 1, and a plurality of grooves 52 are distributed radially along the circumference of the flange 51, the grooves 52 functions as the connecting part between the nozzle 5 and the blower body 1. The other side of the nozzle 5 is a horn shape, an arc 53 is arranged on the upper and lower side symmetrically, and a height between the center of the are 53 of the upper side and the center of the arc 53 of the lower side matches with the maximum scattering angle of the Fresnel Lens, so that the temperature of the user's hair is detected more accurately by the infrared temperature measuring device 2.

The following will illustrate in a concrete way of embodiment. What should be pointed out is that the structure, the technology and the selected material described in the following embodiment is only used to illustrate the feasibility of the implementation method, no intention to limit the scope of protection of the present invention.

The operation principle of constant-temperature electric blower is as shown in the FIG. 8, first, turn on the power of the electric blower, and then press the on-off key on the electric blower, the user then presses the constant-temperature button on the touch control button 4 to set the temperature. The constant-temperature set in the electric blower has, but is not limited to, two levels, 55 degrees and 70 degrees. The user can select the temperature freely according to the ambient temperature, then align the air outlet of the electric blower with the user's hair, so that the infrared temperature measuring device 2 can detect the temperature of user's hair and the temperature signal will be transmitted through the infrared chip assembly 23 in the infrared temperature measuring device 2 and be processed by the MCU processor 6, and processed result on the one hand will be transmitted to and displayed on the LCD device 3, on the other hand will respectively control the speed of rotation of the fan 8 and heating power output of the heating coil 9 through the silicon controlled rectifier 7. When the infrared temperature measuring device 2 detects the temperature of the user's hair exceeding the temperature set by the user, the MCU processor 6 can control the silicon controlled rectifier 7 to decrease the speed of the fan 8 and the heating power output of the heating coil 9 respectively, to lock the hair moisture without causing damage by high temperature. But when the infrared temperature measuring device 2 detects the temperature of the user's hair below the temperature set by the user, the MCU processor 6 can control the silicon controlled rectifier 7 to improve the speed rotation of the fan 8 and the heating power output of the heating coil 9 respectively, to realize healthy hair blowing in constant-temperature.

The fan 8 mentioned the operation principle of constant-temperature electric blower generally has two operation modes, one is AC fan 8 using alternating current, the other is DC motor using direct current. When the AC fan 8 is used, the power line in the electric blower can be directly connected with the electric supply voltage to use electric blower by only incorporating one resistor into the circuit. When the DC fan 8 is used, in the basis of the circuit of the AC fan 8, parallel connect a Zener bridge diode with another resistor, reducing the electric supply voltage entered into the electric blower, adjusting the voltage between 18V and 36V, then the fan 8 can be used.

The electric blower of the embodiment detects the temperature of the user's hair by the infrared temperature measuring device 2, and directly display's the temperature of the user's hair through LCD device 3. Further, the MCU processor 6 controls the silicon controlled rectifier 7 to automatically adjust the heating power output of the electric blower and the speed of rotation of the fan 8 according to the user-set temperature, so that the constant-temperature healthy hair blowing is achieved and damaging the user's hair is avoided.

The foregoing is only the preferred embodiments of the invention, not thus limiting embodiments and scope of the invention, those skilled in the art should be able to realize that the schemes obtained from the content of specification and figures of the invention are within the scope of the invention.

What is claimed is:

1. An infrared intelligent constant-temperature electric blower, comprising:
   a blower body internally provided with a fan and a heating device;
   an infrared temperature measuring device installed at an air outlet of the blower body;
   a LCD device embedded on the outer wall of the blower body;
   a touch control button embedded on the outer wall of the blower body;
   a MCU processor internally arranged in the blower body, the MCU processor having an input terminal connected with the infrared temperature measuring device, and having an output terminal connected with the LCD device;
   two silicon controlled rectifiers, two ends of one silicon controlled rectifier being connected to the MCU processor and the fan respectively, two ends of the other silicon controlled rectifier being connected to the MCU processor and the heating device respectively.

2. The electric blower as claimed in claim 1, wherein an iron net is paved in the air outlet of the blower body;
   the infrared temperature measuring device comprises:
   an infrared chip assembly arranged in the blower body;
   an infrared lens assembly arranged in the blower body and sleeved on the infrared chip assembly;
   a fixed rack penetrating through a central hole of the iron net and engaged with the infrared lens assembly and the infrared chip assembly respectively;
   wherein the fixed rack and the infrared lens assembly are combined to form a clamping part of the iron net.

3. The electric blower as claimed in claim 2, wherein the fixed rack comprises a circular ring and two supporting legs arranged along the outer wall of the circular ring symmetrically; wherein two square grooves and a breach are arranged along the axis direction of the circular ring, and one square groove adjacent to the circular ring is engaged with a convex block on the infrared lens assembly, the other square groove away from the circular ring is engaged with a convex block on the infrared chip assembly, the breach is fitted with a connection part on the blower main body.

4. The electric blower as claimed in claim 1, wherein the LCD device comprises:
   an LCD screen embedded on a groove of the outer wall of the blower body;

a display screen shield arranged on the periphery of the LCD screen; and a lens embedded on the display screen shield;

wherein a frame is arranged in the groove for positioning the LCD screen, a round hole of each corner of the display screen shield is fitted with a column of each corner of the frame, and a groove on the upper side of the display screen shield functions as a routing path between the LCD screen and a main program control circuit board assembly in the blower body.

5. The electric blower as claimed in claim 4, wherein the touch control button comprises from inside to outside successively: a button control circuit board, a button pad, a button circuit board bracket, a function button and a function button bracket;

one side of the button control circuit board is connected with the main program control circuit board assembly through a lead;

wherein a convex cavity on the button pad is fitted with the button on the button control circuit board, and is connected with the mounting hole on the button control circuit board through a column on the back of the button circuit board bracket, the button on the button control circuit board passes through the square holes longitudinally distributed along the button circuit board bracket and opening grooves on the both sides of the square holes, and is fitted in the function button and the function button bracket successively.

6. The electric blower as claimed in claim 1, further comprising a nozzle detachably installed at the air outlet of the blower body, wherein, the nozzle is provided with a flange at the side which is connected with the blower main body, and a plurality of grooves are distributed radially along the circumference of the flange; the other side of the nozzle is a horn shape, an arc is arranged on the upper and lower sides symmetrically.

7. The electric blower as claimed in claim 1, wherein a height between the center of the arc of the upper side and the center of the arc of the lower side, matches a maximum scattering angle of the infrared lens assembly.

* * * * *